United States Patent
Rachuy

(10) Patent No.: US 9,097,269 B2
(45) Date of Patent: Aug. 4, 2015

(54) BRACKET ASSEMBLIES FOR USE WITH ACTUATORS

(75) Inventor: Mark Allen Rachuy, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 0 days.

(21) Appl. No.: 13/488,013

(22) Filed: Jun. 4, 2012

(65) Prior Publication Data

US 2013/0320184 A1     Dec. 5, 2013

(51) Int. Cl.

| | |
|---|---|
| F16M 13/00 | (2006.01) |
| F16B 5/02 | (2006.01) |
| F04B 39/00 | (2006.01) |
| F04B 53/00 | (2006.01) |
| H02K 5/24 | (2006.01) |
| H02K 5/26 | (2006.01) |
| H02K 11/00 | (2006.01) |
| F16M 1/00 | (2006.01) |

(Continued)

(52) U.S. Cl.
CPC ........... *F16B 5/0241* (2013.01); *F04B 39/0044* (2013.01); *F04B 53/003* (2013.01); *H02K 5/24* (2013.01); *H02K 5/26* (2013.01); *H02K 11/0073* (2013.01); *H02K 2213/09* (2013.01)

(58) Field of Classification Search
CPC . F16H 57/025; F16H 57/021; H02K 11/0073; H02K 5/24; H02K 5/26; H02K 2213/09; F16B 5/0241; F16M 13/00; F16M 1/00; F16M 7/00; F16M 5/00; F16M 11/00
USPC ................. 248/592, 634, 200, 638, 674, 300; 4/384; 16/29; 310/91, 89; 251/3, 8, 21, 251/23, 143; 188/73.39; 303/119.3, DIG. 10
See application file for complete search history.

(56) References Cited

U.S. PATENT DOCUMENTS 2,603,983 A * 7/1952 Rieser ............................. 74/640
3,326,503 A * 6/1967 Bade .............................. 248/672

(Continued)

FOREIGN PATENT DOCUMENTS

| CN | 201176491 | 1/2009 |
|---|---|---|
| JP | S5745256 | 3/1982 |
| JP | 2007209185 | 8/2007 |

OTHER PUBLICATIONS http://www.carrlane.com/catalog/index.cfm/2982F1D0F0F1751 1D0A542A1B10172D0D171B03005E221E0107070F1A2717180 F0A1E4A3E111D081B00063327274F5D5D5B.*

(Continued)

*Primary Examiner* — Jonathan Liu
*Assistant Examiner* — Muhammad Ijaz
(74) *Attorney, Agent, or Firm* — Hanley, Flight & Zimmerman, LLC

(57) ABSTRACT

Bracket assemblies for use with actuators are described. An example apparatus includes a bracket defining first apertures and second apertures. The first apertures are to receive fasteners to couple a first end of the bracket to an actuator. One or more of the second apertures is to receive fasteners to couple a controller to the bracket. The actuator is to be on a first side of the bracket and the controller to be on a second side of the bracket. The example apparatus also includes an adjuster to be coupled to the bracket. The adjuster is to vary a distance between a second end of the bracket and the actuator and to support the second end relative to the actuator.

20 Claims, 4 Drawing Sheets

(51) Int. Cl.
*F16M 3/00* (2006.01)
*F16M 5/00* (2006.01)
*F16M 7/00* (2006.01)
*F16M 11/00* (2006.01)

(56) References Cited

U.S. PATENT DOCUMENTS

| | | | | |
|---|---|---|---|---|
| 3,395,594 | A | * | 8/1968 | Balair .......................... 74/606 R |
| 3,516,627 | A | * | 6/1970 | Gable et al. .................... 248/560 |
| 4,033,531 | A | * | 7/1977 | Levine .......................... 248/558 |
| 4,439,900 | A | * | 4/1984 | Lowe ............................. 24/514 |
| 4,719,939 | A | * | 1/1988 | Killian .................... 137/315.35 |
| 4,849,667 | A | * | 7/1989 | Morrill ........................... 310/91 |
| 5,160,113 | A | * | 11/1992 | Whiddon ...................... 248/638 |
| 5,221,869 | A | | 6/1993 | Williams et al. |
| 6,304,016 | B1 | | 10/2001 | Frederick et al. |
| 6,386,615 | B2 | * | 5/2002 | Neubrand et al. .............. 296/76 |
| 6,450,782 | B1 | * | 9/2002 | Sakamoto ...................... 417/359 |
| 7,360,313 | B1 | * | 4/2008 | Hamm et al. .................... 33/265 |
| 7,510,163 | B2 | * | 3/2009 | Schlitzkus et al. ............. 248/635 |
| 7,641,172 | B2 | * | 1/2010 | Richards et al. ......... 251/129.04 |
| 8,004,135 | B2 | * | 8/2011 | Peterson et al. ................. 310/89 |
| 2002/0090258 | A1 | * | 7/2002 | Lewis et al. ................ 403/374.3 |
| 2006/0071131 | A1 | * | 4/2006 | Young et al. ................... 248/200 |
| 2007/0227295 | A1 | * | 10/2007 | Leimann ......................... 74/640 |
| 2008/0142674 | A1 | * | 6/2008 | Dang et al. ..................... 248/674 |
| 2012/0007457 | A1 | * | 1/2012 | Andersson et al. ............. 310/91 |

OTHER PUBLICATIONS

International Searching Authority, "International Search Report," issued in connection with PCT Application No. PCT/US2013/043026, mailed on Oct. 20, 2014, 3 pages.

International Searching Authority, "Written Opinion," issued in connection with PCT Application No. PCT/US2013/043026, mailed on Oct. 20, 2014, 5 pages.

* cited by examiner

BRACKET ASSEMBLIES FOR USE WITH ACTUATORS

FIELD OF THE DISCLOSURE

This patent relates generally to bracket assemblies and, more specifically, to bracket assemblies for use with actuators.

BACKGROUND

A controller may be used to measure and control a position of an actuator. In some examples, a bracket may be used to couple the controller to the actuator.

SUMMARY

An example apparatus includes a bracket defining first apertures and second apertures. The first apertures are to receive fasteners to couple a first end of the bracket to an actuator. One or more of the second apertures are to receive fasteners to couple a controller to the bracket. The actuator is to be on a first side of the bracket and the controller is to be on a second side of the bracket. The example apparatus also includes an adjuster to be coupled to the bracket. The adjuster is to vary a distance between a second end of the bracket and the actuator and to support the second end relative to the actuator.

Another example apparatus includes a bracket defining first apertures and second apertures. The first apertures are to receive fasteners to couple a first end of the bracket to an actuator. One or more of the second apertures are to receive fasteners to couple a controller to the bracket. The actuator is to be on a first side of the bracket and the controller is to be on a second side of the bracket. The apparatus also includes an adjuster to be coupled to the bracket and to be adjustable to dampen vibrations.

DETAILED DESCRIPTION

Figure 1:
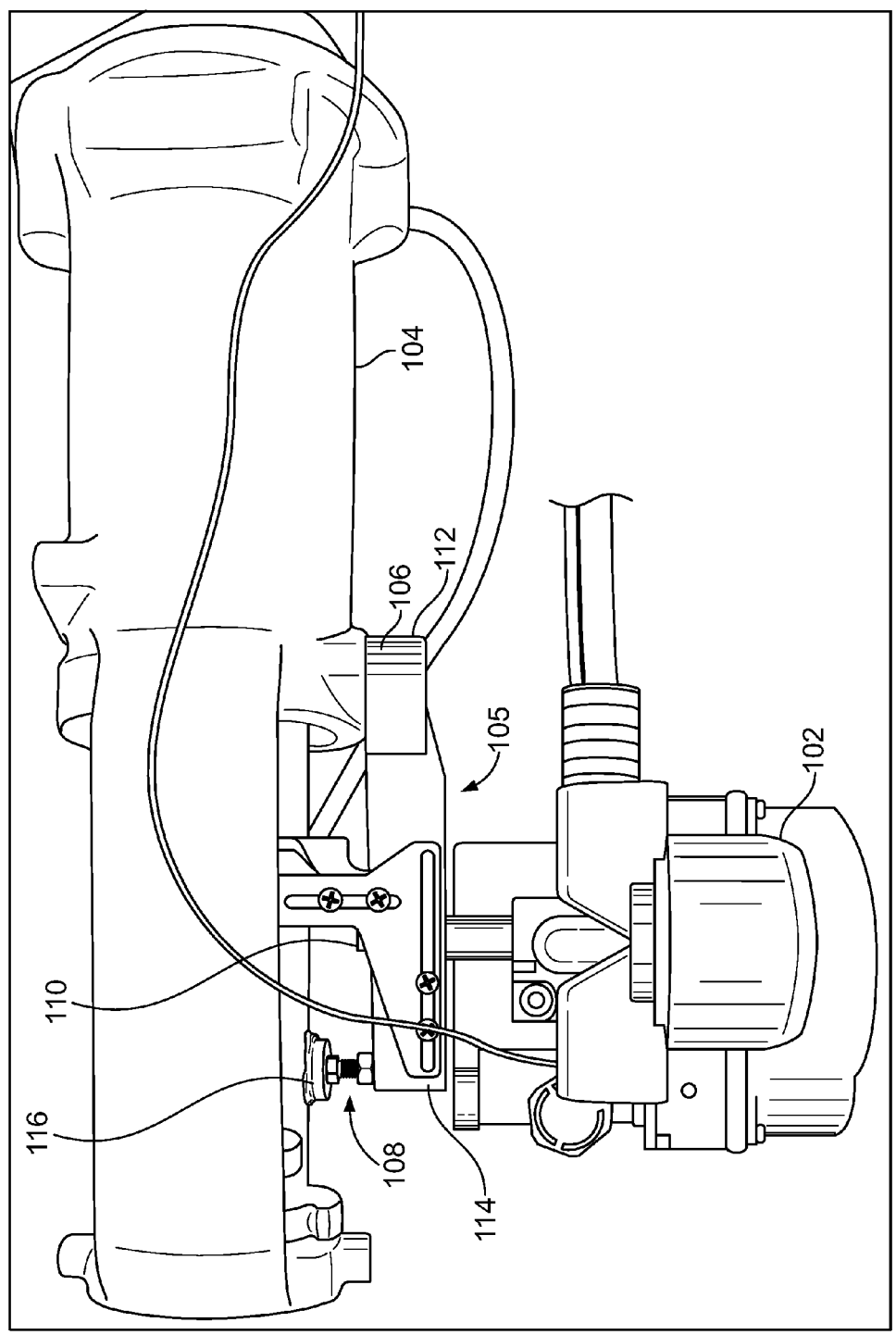
FIG. 1 depicts an example bracket assembly coupling a controller and an actuator.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to example bracket assemblies to couple controllers and actuators in a control system. In some known examples, fasteners couple a first end of a bracket to an actuator and a second end of the bracket is unsupported or free. The second end may be unsupported because the different actuators with which the bracket assemblies are used have different yokes sizes with different mounting hole spacings and/or arrangements. However, leaving the second end unsupported allows the second end of the bracket to oscillate harmonically as process fluid flows through the associated control valve. The magnitude of the oscillations may increase when the vibrational frequencies of the process fluid and the natural frequencies of the control valve system are substantially equal. Oscillating the bracket may loosen and/or break fasteners that couple the bracket to the actuator.

In contrast, the example bracket assemblies disclosed herein substantially prevent fasteners that couple a bracket to an actuator from loosening and/or breaking in applications where the actuator and/or other components of the control system vibrate, while also enabling the example bracket assemblies to be used with different actuator models having different yoke sizes and/or different mounting hole spacings and/or arrangements. In some examples, the example bracket assemblies may include a bracket and an example adjuster or adjustment member. The bracket includes a first end and a second end and defines a plurality of apertures and/or mounting holes.

In operation, fasteners and the adjustment member couple a controller to the bracket, and fasteners couple the first end of the bracket to the actuator body. After coupling the controller to the bracket, the adjustment member extends from the bracket adjacent its second end such that an elastomeric base of the adjustment member engages the actuator body and supports the second end and/or places the bracket in tension. Thus, using the examples disclosed, both the first and second bracket ends are supported or mechanically coupled to the actuator, which prevents the bracket from oscillating and the associated problems encountered in known examples.

To tension the bracket, enable the bracket to be substantially parallel to a longitudinal axis of the actuator body and/or to ensure that the second end is fully supported, a distance between the second end and the actuator may be adjusted by operating (e.g., manually rotating) the adjustment member. In addition, to prevent movement of the adjustment member relative to the bracket, a locknut that threadably engages an elongate body of the adjustment member may be tightened against the bracket.

FIG. 1 depicts a controller 102, an actuator 104 and an example bracket assembly 105 that includes a bracket 106 and an adjustment member or adjuster 108. The controller 102 may be used to determine and provide feedback related to a position of the actuator 104, and the bracket assembly 105 may be used to couple the controller 102 and the actuator 104.

In operation, fasteners 110 and the adjuster 108 extend through apertures 202, 204 and 206 (FIG. 2) of the bracket 106 to couple the controller 102 to the bracket 106 by threadably engaging the controller 102, and fasteners 207 (FIG. 2) extend through apertures 208 and 210 (FIG. 2) of the bracket 106 to couple a first end 112 of the bracket 106 to the actuator 104. To enable a second end 114 of the bracket 106 to be supported by or mechanically coupled to the actuator 104, the adjuster 108 extends from the bracket 106 and engages a surface 116 of the actuator 104. Placing the bracket 106 in tension by having both the first and second ends 112 and 114 mechanically coupled to the actuator 104 substantially dampens vibrations and/or substantially prevents the bracket 106 from oscillating as process fluid flows through an associated control valve (not shown).

Additionally, having the second end 114 supported but not directly coupled or fixed to the actuator 104 enables the bracket assembly 105 to be used with different actuator models having different yoke sizes and/or mounting hole spacings and/or mounting hole arrangements. In other words, in this example, there is no fastener extending through the bracket 106 adjacent its second end 114 and threadably engaging the actuator 104.

Figure 2:
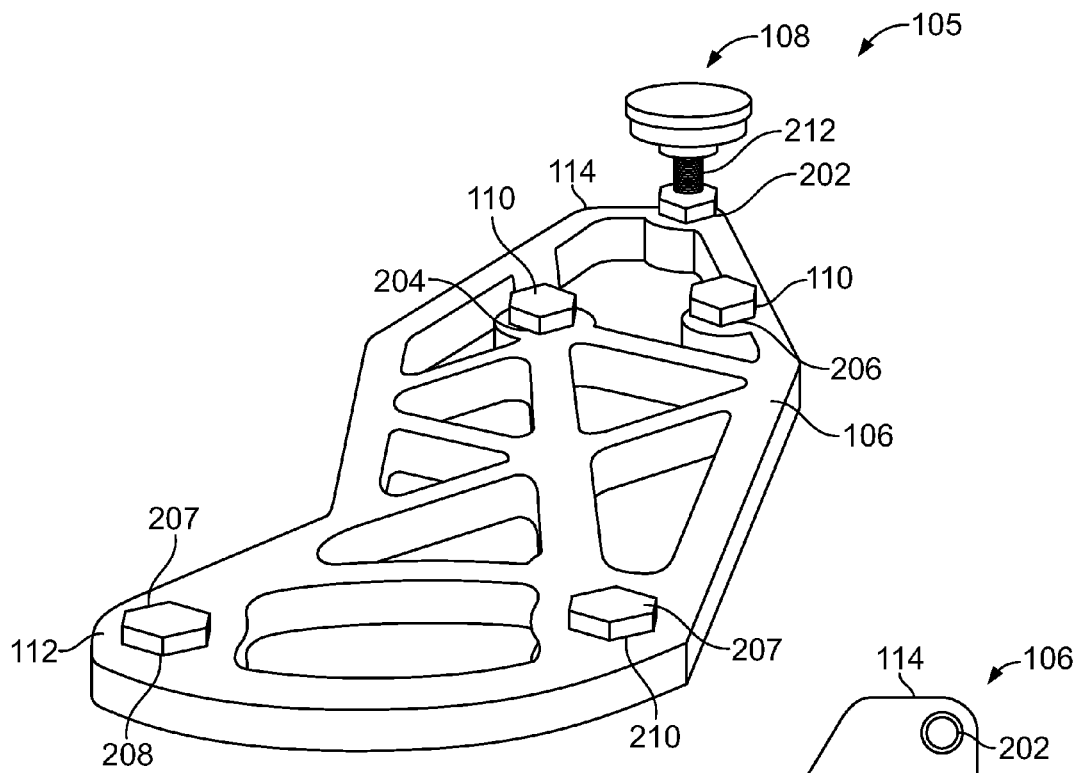
FIG. 2 depicts the example bracket assembly of FIG. 1.
Figure 3:
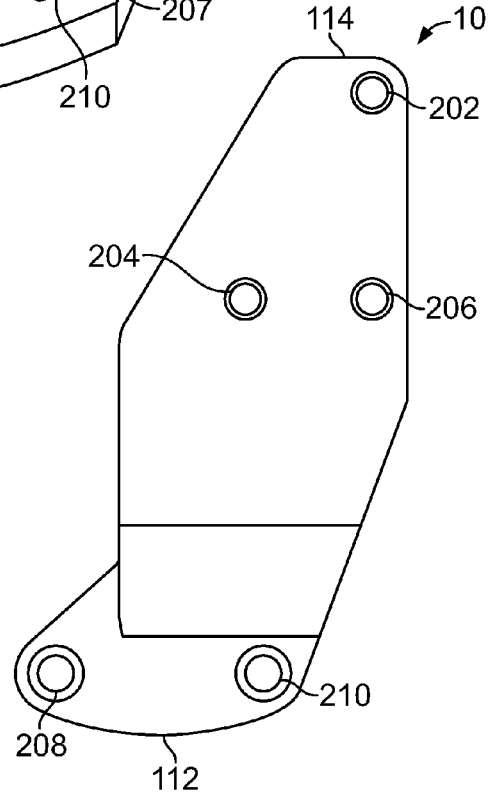
FIG. 3 depicts an example bracket of the bracket assembly of FIG. 1.

FIG. 2 depicts the bracket 106 and the adjuster 108 of the example bracket assembly 105. As shown, the bracket assembly 105 includes the apertures 202-206 through which the fasteners 110 and an elongate body 212 of the adjuster 108 extends to couple the controller 102 to the bracket 106. In other examples, the elongate body 212 may be coupled to and/or threadably engage the bracket 106, but is not used to couple the controller 102 to the bracket 106. In operation, the fasteners 207 extend through the apertures 208 and 210 to couple the first end 112 to the actuator 104. FIG. 3 is a plan view of the bracket 106 without the fasteners 110 or the adjuster 108.

Figure 4:
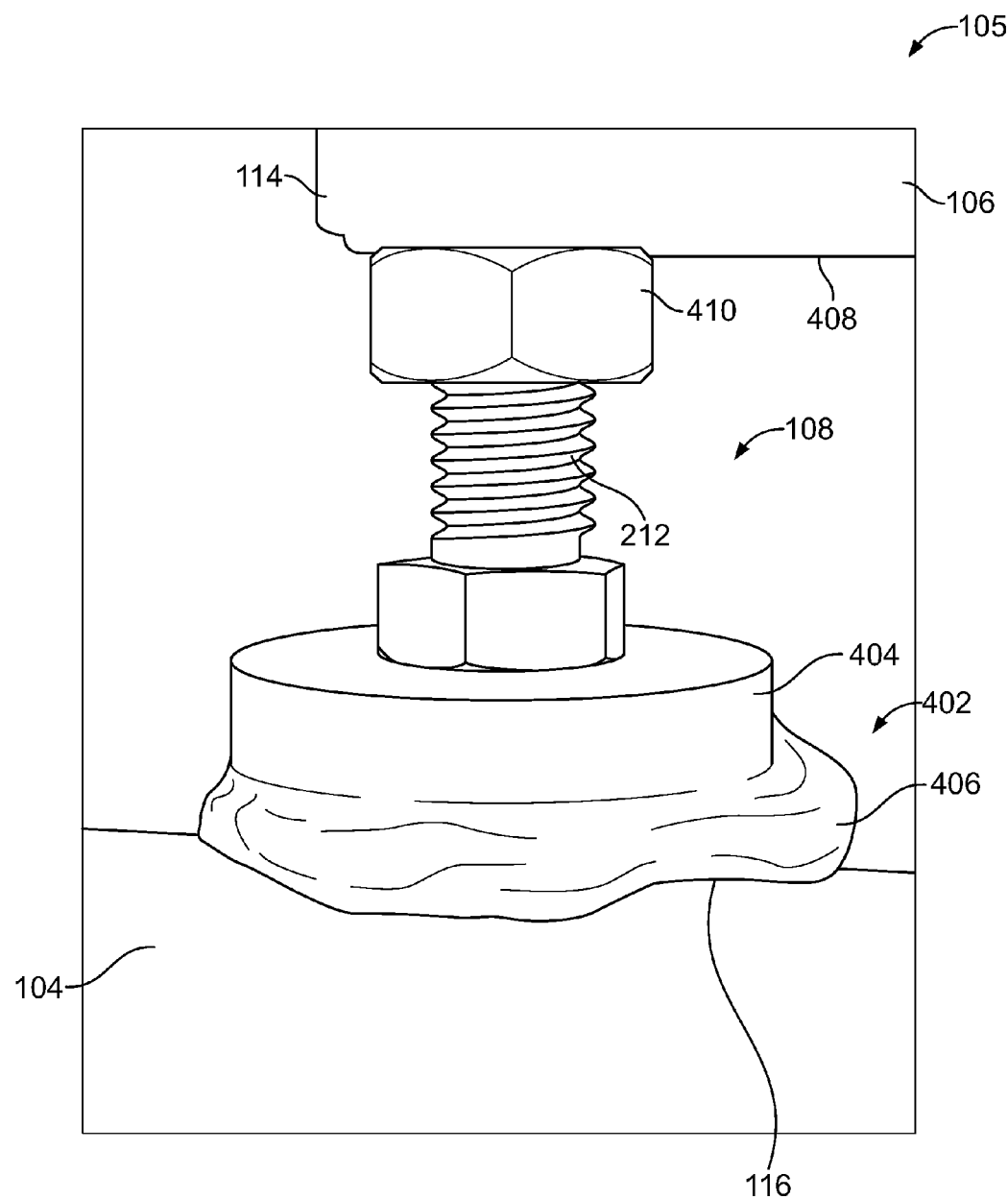
FIG. 4 depicts a detailed view of the engagement between an example adjuster of the example bracket assembly and the actuator.

FIG. 4 depicts a detailed view of the engagement between a base 402 of the adjuster 108 and the surface 116 of the actuator 104. In this example, the base 402 includes a first portion 404 and a second portion 406. The first portion 404 may be composed of a metal material and may be coupled (e.g., welded) to the elongate body 212. In other examples, the first portion 404 and the elongate body 212 are integrally formed from a single piece of material (e.g., machined from a single piece of bar stock). The second portion 406 may be composed of an elastomeric material and may be coupled to the first portion 404 using any suitable method such as an adhesive, for example. In this example, the first and second portions 404 and 406 have a cylindrical and/or disc shape. However, any other shapes(s) may be used instead.

In operation, the adjuster 108 may be adjusted (e.g., rotated) to support the second end 114 of the bracket 106 relative to the actuator 104 to place the bracket 106 in tension and/or to enable a surface 408 of the bracket 106 to be substantially parallel to the surface 116 of the actuator 104. Once the adjuster 108 is in a desired position, a lock nut 410, which threadably engages the elongate body 212, may be rotated until the lock nut 410 engages the surface 408 to substantially maintain a position of the adjuster 108 relative to the bracket 106 and/or the actuator 104.

Figure 5:
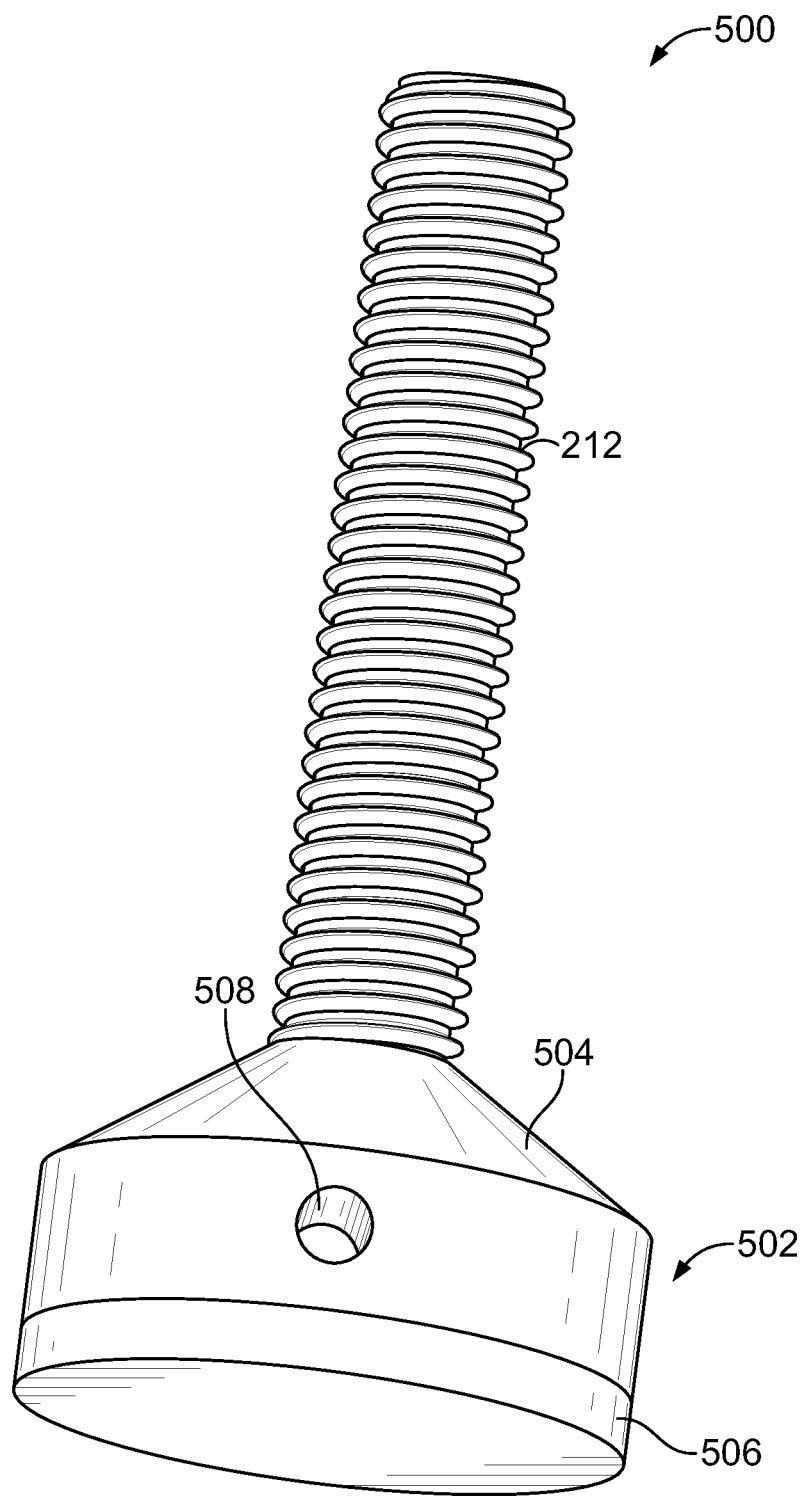
FIG. 5 depicts an example adjuster that can be used to implement the example bracket assembly of FIG. 1.

FIG. 5 depicts an example adjustment member or adjuster 500 that may be used to implement the examples disclosed herein. The adjuster 500 includes the elongate body 212 and a base or foot 502. In this example, the foot 502 includes a first portion 504 and a second portion 506, which is coupled to the first portion 504. The first portion 504 defines an aperture 508 that is to receive a tool (not shown) to enable the adjuster 500 to be rotated to change a distance between the second end 114 of the bracket 106 and the actuator 104. The first portion 504 may composed of a metal material and the second portion 506 may be composed of an elastomeric material.

As set forth herein, an example apparatus includes a single-piece bracket having one or more intersecting ribs connecting a perimeter of the bracket for structural support. The example bracket is configured to couple a fluid control actuator and a fluid control actuator controller and the bracket defines first apertures and second apertures. The first apertures are to receive fasteners to couple a first end of the bracket to the fluid control actuator, one or more of the second apertures are to receive fasteners to couple the fluid control actuator controller to the bracket. The fluid control actuator is to be on a first side of the bracket and the fluid control actuator controller is to be on a second side of the bracket. An adjuster is to extend through one of the second apertures to couple the fluid control actuator controller to the bracket, the adjuster is not to extend through the fluid control actuator, the adjuster having an end to drive against a surface of the fluid control actuator, the adjuster is to non-threadably engage the fluid control actuator, the adjuster is to vary a distance between a second end of the bracket and the fluid control actuator. The adjuster is to support the second end of the bracket relative to the fluid control actuator based on the engagement with the fluid control actuator.

In some examples, the bracket is to be substantially parallel to a longitudinal axis of the fluid control actuator. In some examples, the end is a first end, and the adjuster includes a second end opposite the first end, the second end of the adjuster is to threadably engage the fluid control actuator controller. In some examples, the adjuster includes an elongate body and a base, the base includes the end to engage the fluid control actuator, and the elongate body is to threadably engage one or more of the bracket or the fluid control actuator controller to enable the distance between the second end of the bracket and the fluid control actuator to vary.

In some examples, the apparatus includes a locknut to threadably engage the elongate body and to engage the first side of the bracket to secure the position of the elongate body relative to the bracket. In some examples, the apparatus includes an aperture formed in the base to receive a tool to operate the adjuster. In some examples, the base is a disc. In some examples, the base is elastomeric material to dampen vibrations of the bracket, the elastomeric material is to be driven against the surface of the fluid control actuator. In some examples, the first and second apertures extend through the bracket in the same direction. In some examples, the first end is opposite the second end along a longitudinal axis of the bracket.

An example apparatus includes a fluid control actuator controller, a fluid control actuator, and a bracket defining first apertures and second apertures. The bracket is configured to couple the fluid control actuator and the fluid control actuator controller. A first rib is to extend between a first perimeter edge of the bracket and a second perimeter edge of the bracket for structural support and a second rib is to extend between the first perimeter edge and the second perimeter edge for structural support, the first rib is to intersect the second rib. The first apertures are to receive fasteners to couple a first end of the bracket to the fluid control actuator. One or more of the second apertures is to receive fasteners to couple the fluid control actuator controller to the bracket, the fluid control actuator is to be on a first side of the bracket and the fluid control actuator controller is to be on a second side of the bracket. An adjuster is to be coupled to the bracket, the adjuster is to couple the fluid control actuator to the bracket, the adjuster has an end to be driven against a surface of the fluid control actuator to dampen vibrations. In some examples, the bracket is to be substantially parallel to a longitudinal axis of the fluid control actuator. In some examples, the adjuster is to extend through one of the second apertures to couple the fluid control actuator controller to the bracket. In some examples, the adjuster is to threadably engage the fluid control actuator controller to couple the adjuster to the bracket. In some examples, the adjuster includes an elongate body and a base, the base including the end to engage the fluid control actuator, the elongate body is to threadably engage one or more of the bracket or the fluid control actuator controller to enable a distance between a second end of the bracket and the fluid control actuator to change. In some examples, the apparatus includes a locknut to threadably engage the elongate body and to engage the first side of the bracket to secure the position of the elongate body relative to the bracket. In some examples, the apparatus includes an aperture defined by the base to receive a tool to engage the adjuster. In some examples, the base of the adjuster is a disc. In some examples, the base is elastomeric material to directly engage the fluid control actuator. In some examples, the adjuster non-threadably engages the surface of the fluid control actuator.

An example apparatus includes a fluid control actuator, a fluid control actuator controller, a bracket defining apertures, some of the apertures are to receive fasteners to couple a first end of the bracket to the actuator, one or more of the other apertures is to receive fasteners to couple the fluid control actuator controller to the bracket, and means for changing a distance between a second end of the bracket and the fluid control actuator to support the second end relative to the fluid control actuator to dampen vibrations of the bracket. In some examples, the means for changing a distance between the second end and the fluid control actuator is to enable an adjustment of the bracket to be substantially parallel to a longitudinal axis of the actuator. In some examples, the means for changing a distance between the second end and the fluid control actuator includes an elongate body and a base, the base is to engage the actuator, the elongate body is to threadably engage one or more of the bracket or the fluid control actuator controller to enable the distance between the second end of the bracket and the fluid control actuator to change. In some examples, the means for changing a distance non-threadably engages the fluid control actuator.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
a single-piece bracket comprising one or more intersecting ribs connecting a perimeter of the bracket for structural support, the bracket configured to couple a fluid control actuator and a fluid control actuator controller, the bracket defining first apertures and second apertures, the first apertures to receive fasteners to couple a first end of the bracket to the fluid control actuator, one or more of the second apertures to receive fasteners to couple the fluid control actuator controller to the bracket, the fluid control actuator to be on a first side of the bracket and the fluid control actuator controller to be on a second side of the bracket; and
an adjuster to extend through one of the second apertures to couple the fluid control actuator controller to the bracket, the adjuster not to extend through the fluid control actuator, the adjuster having an end to drive against a surface of the fluid control actuator, the adjuster to non-threadably engage the fluid control actuator, the adjuster to vary a distance between a second end of the bracket and the fluid control actuator, the adjuster to support the second end of the bracket relative to the fluid control actuator based on the engagement with the fluid control actuator.

2. The apparatus of claim 1, wherein the bracket is to be substantially parallel to a longitudinal axis of the fluid control actuator.

3. The apparatus of claim 1, wherein the end comprises a first end, and the adjuster comprises a second end opposite the first end, the second end of the adjuster to threadably engage the fluid control actuator controller.

4. The apparatus of claim 1, wherein the adjuster comprises an elongate body and a base, the base comprising the end to engage the fluid control actuator, the elongate body to threadably engage one or more of the bracket or the fluid control actuator controller to enable the distance between the second end of the bracket and the fluid control actuator to vary.

5. The apparatus of claim 4, further comprising a locknut to threadably engage the elongate body and to engage the first side of the bracket to secure a position of the elongate body relative to the bracket.

6. The apparatus of claim 4, further comprising an aperture formed in the base to receive a tool to operate the adjuster.

7. The apparatus of claim 4, wherein the base comprises a disc.

8. The apparatus of claim 4, wherein the base comprises elastomeric material to dampen vibrations of the bracket, the elastomeric material to be driven against the surface of the fluid control actuator.

9. The apparatus of claim 1, wherein the first and second apertures extend through the bracket in the same direction.

10. The apparatus of claim 1, wherein the first end is opposite the second end along a longitudinal axis of the bracket.

11. An apparatus, comprising:
a fluid control actuator controller;
a fluid control actuator;
a bracket defining first apertures and second apertures, the bracket configured to couple the fluid control actuator and the fluid control actuator controller, a first rib to extend between a first perimeter edge of the bracket and a second perimeter edge of the bracket for structural support, a second rib to extend between the first perimeter edge and the second perimeter edge for structural support, the first rib to intersect the second rib, the first apertures to receive fasteners to couple a first end of the bracket to the fluid control actuator, one or more of the second apertures to receive fasteners to couple the fluid control actuator controller to the bracket, the fluid control actuator to be on a first side of the bracket and the fluid control actuator controller to be on a second side of the bracket; and
an adjuster to be coupled to the bracket, the adjuster to couple the fluid control actuator to the bracket, the adjuster having an end to be driven against a surface of the fluid control actuator to dampen vibrations.

12. The apparatus of claim 11, wherein the bracket is to be substantially parallel to a longitudinal axis of the fluid control actuator.

13. The apparatus of claim 11, wherein the adjuster is to extend through one of the second apertures to couple the fluid control actuator controller to the bracket.

14. The apparatus of claim 13, wherein the adjuster is to threadably engage the fluid control actuator controller to couple the adjuster to the bracket.

15. The apparatus of claim 14, wherein the adjuster comprises an elongate body and a base, the base comprising the end to engage the fluid control actuator, the elongate body to threadably engage one or more of the bracket or the fluid control actuator controller to enable a distance between a second end of the bracket and the fluid control actuator to change.

16. The apparatus of claim 15, further comprising a locknut to threadably engage the elongate body and to engage the first side of the bracket to secure a position of the elongate body relative to the bracket.

17. The apparatus of claim 15, further comprising an aperture defined by the base to receive a tool to engage the adjuster.

18. The apparatus of claim 15, wherein the base of the adjuster comprises a disc.

19. The apparatus of claim 15, wherein the base comprises elastomeric material to directly engage the fluid control actuator.

20. The apparatus of claim 11, wherein the adjuster non-threadably engages the surface of the fluid control actuator.

* * * * *